US012558579B2

(12) United States Patent
Underwood et al.

(10) Patent No.: US 12,558,579 B2
(45) Date of Patent: Feb. 24, 2026

(54) WOVEN FABRIC WITH INTRICATE DESIGN

(71) Applicant: International Textile Group, Inc., Greensboro, NC (US)

(72) Inventors: Joey K. Underwood, Greenville, SC (US); Jacques A. Cantin, Greenville, SC (US)

(73) Assignee: Elevate Textiles, Inc., Greensboro, NC (US)

(*) Notice: Subject to any disclaimer, the term of this patent is extended or adjusted under 35 U.S.C. 154(b) by 0 days.

(21) Appl. No.: 16/665,142

(22) Filed: Oct. 28, 2019

(65) Prior Publication Data

US 2020/0071860 A1 Mar. 5, 2020

Related U.S. Application Data

(63) Continuation of application No. 15/331,950, filed on Oct. 24, 2016, now abandoned.

(Continued)

(51) Int. Cl.

*A62B 17/00* (2006.01)
*A41D 31/08* (2019.01)

(Continued)

(52) U.S. Cl.

CPC ............ *A62B 17/003* (2013.01); *A41D 31/08* (2019.02); *D02G 3/443* (2013.01); *D03D 1/0035* (2013.01);

(Continued)

(58) Field of Classification Search

None

See application file for complete search history.

(56) References Cited

U.S. PATENT DOCUMENTS 3,019,821 A 2/1962 White
3,729,920 A 5/1973 Sayers et al.

(Continued)

FOREIGN PATENT DOCUMENTS

EP 2644759 * 10/2013
GB 2275934 9/1994

(Continued)

OTHER PUBLICATIONS

Griffiths ("Dave's Blog of Art and Programming", Dec. 22, 2014, url: http://www.pawfal.org/dave/blog/2014/12/coding-with-threads-frame-loom/). (Year: 2014).*

(Continued)

*Primary Examiner* — Shawn Mckinnon

(74) *Attorney, Agent, or Firm* — Dority & Manning, P.A.

(57) ABSTRACT

Fabrics that have a pattern of discrete ornamental designs are disclosed that can be used in numerous applications. In one embodiment, the fabric can be made from flame resistant fibers for use in protective garments, especially firefighting garments. The discrete designs make the fabric readily recognizable that provides an indicia for the excellent physical properties of the fabric. For instance, not only is the fabric lightweight, strong and abrasion resistant, but also has excellent stretch properties in multiple directions, especially in directions diagonal to the warp direction and the fill direction.

23 Claims, 9 Drawing Sheets

Related U.S. Application Data

(60) Provisional application No. 62/251,409, filed on Nov. 5, 2015.

(51) Int. Cl.
*D02G 3/44* (2006.01)
*D03D 1/00* (2006.01)
*D03D 13/00* (2006.01)
*D03D 15/513* (2021.01)

(52) U.S. Cl.
CPC ......... *D03D 13/004* (2013.01); *D03D 15/513* (2021.01); *D10B 2501/04* (2013.01)

(56) References Cited

U.S. PATENT DOCUMENTS

| | | | |
|---|---|---|---|
| 4,304,811 | A | 12/1981 | David et al. |
| 4,749,378 | A | 6/1988 | Cates et al. |
| 4,759,770 | A | 7/1988 | Cates et al. |
| 5,299,602 | A | 4/1994 | Barbeau et al. |
| 5,858,888 | A | 1/1999 | Underwood et al. |
| 5,928,971 | A | 7/1999 | Ellis et al. |
| 6,065,153 | A | 5/2000 | Underwood et al. |
| 6,132,476 | A | 10/2000 | Lunsford et al. |
| 6,192,520 | B1 | 2/2001 | Underwood et al. |
| 6,247,179 | B1 | 6/2001 | Underwood et al. |
| 6,460,321 | B1 | 10/2002 | Koshimae et al. |
| 6,547,835 | B1 | 4/2003 | Lunsford et al. |
| 6,606,749 | B2 | 8/2003 | Underwood et al. |
| 6,624,096 | B2 | 9/2003 | Thomas et al. |
| 6,750,162 | B2 | 6/2004 | Underwood et al. |
| 6,818,024 | B2 | 11/2004 | Lunsford et al. |
| 6,867,154 | B1 | 3/2005 | Lunsford et al. |
| 6,886,184 | B2 | 5/2005 | Underwood et al. |
| 6,974,785 | B1 | 12/2005 | Barbeau et al. |
| 7,393,800 | B2 | 7/2008 | Corner |
| 7,581,260 | B2 | 9/2009 | Underwood et al. |
| 7,589,036 | B2 | 9/2009 | Corner et al. |
| 7,811,952 | B2 | 10/2010 | Truesdale, III et al. |
| 7,862,865 | B2 | 1/2011 | Truesdale, III et al. |
| 8,071,492 | B2 | 12/2011 | Hess et al. |
| 8,209,785 | B2 | 7/2012 | Underwood et al. |
| 8,528,120 | B2 | 9/2013 | Underwood et al. |
| 8,614,156 | B2 | 12/2013 | Hess et al. |
| 8,819,866 | B2 | 9/2014 | Underwood et al. |
| 9,364,694 | B2 | 6/2016 | Underwood et al. |
| 2002/0026663 | A1 | 3/2002 | Underwood et al. |
| 2003/0040240 | A1 | 2/2003 | Thomas |
| 2003/0203690 | A1 | 10/2003 | Hess et al. |
| 2003/0228812 | A1 | 12/2003 | Stanhope et al. |
| 2004/0034905 | A1 | 2/2004 | Underwood et al. |
| 2004/0092187 | A1 | 5/2004 | Favier et al. |
| 2004/0152378 | A1 | 8/2004 | Stanhope et al. |
| 2005/0155131 | A1 | 7/2005 | Underwood et al. |
| 2005/0158559 | A1 | 7/2005 | Martin et al. |
| 2005/0186875 | A1 | 8/2005 | Lilani |
| 2006/0154542 | A1 | 7/2006 | Underwood et al. |
| 2007/0072502 | A1 | 3/2007 | Underwood et al. |
| 2011/0049949 | A1 | 3/2011 | Basmaji et al. |
| 2011/0165807 | A1 | 7/2011 | Underwood et al. |
| 2011/0191949 | A1 | 8/2011 | Underwood et al. |
| 2011/0281097 | A1 | 11/2011 | Li et al. |
| 2012/0270456 | A1 | 10/2012 | Gstettner et al. |
| 2013/0008554 | A1 | 1/2013 | Fisher et al. |

FOREIGN PATENT DOCUMENTS

| | | | |
|---|---|---|---|
| GB | 2516134 | * | 1/2015 |
| WO | WO 2011/050376 A1 | | 5/2011 |

OTHER PUBLICATIONS

Egly-Thompson ( https://www.houzz.com/magazine/pattern-focus-greek-key-stsetivw-vs-47415351, May 6, 2015). (Year: 2015).*
Handbook of Fibrous Materials, Jinlian Hu et al., 2020, pp. 482. (Year: 2020).*
Duralite Fabric Information Including Morning Pride Press Release and Slides, 7 pages.
Safety Components Data Sheet on ARMOR 5.5, one page.
Safety Components Brochure on ARMOR 7.0, 34 pages.
David Griffiths: "dave's blog of art and programming", Dec. 14, 2014 Retrieved from the Internet: https://www.pawfal.org/dave/blog/2014/12/dyadic-device-a-4-shaft-loom-simulation (retrieved Apr. 9, 2024).
Duralite Fabric Information Including Morning Pride Press Release and Slides, 7 pages, 1994.
Safety Components Data Sheet on ARMOR 5.5, one page, 2007.
Safety Components Brochure on ARMOR 7.0, 34 pages, 2006.
Properties of Armos Para-Aramid Fibres in Conditions of Use. Comparison with Other Para-Aramids, K.E. Perepelkin et al., Fibre Chemistry, vol. 33, No. 2, 2001, pp. 105-114.
Abstract of JP 2009280942 dated Dec. 3, 2009, 2 pages.
EP Application No. EP 16197548.7 International Search Report dated May 12, 2017, 8 pages.
David Griffiths: "dave's blog of art and programming", Dec. 22, 2104 (Dec. 22, 2014)Retrieved from the Internet: URL:http:/www.pawfal.org/dave/blog/2014/12/coding-with-threads-frame-loom/ [retrieved on Mar. 29, 2017].

* cited by examiner

WOVEN FABRIC WITH INTRICATE DESIGN

RELATED APPLICATIONS

The present application is based on and claims priority to U.S. patent application Ser. No. 15/331,950 filed on Oct. 24, 2016, and U.S. Provisional Patent application having Ser. No. 62/251,409 filed on Nov. 5, 2015, both of which are incorporated herein by reference.

BACKGROUND

Various different types of protective garments exist that are intended to provide protection to the wearer. In certain embodiments, for instance, the protective garments are designed to provide protection from heat and flame so as to prevent burn injuries. Such protective garments, for instance, are typically worn by firefighters, other service providers, and military personnel. Military personnel, for instance, wear such garments to provide protection against incendiary devices and the like.

Such garments should be fire resistant while also being as light as possible, strong, abrasion resistant, rip and tear resistant, flexible, and should encumber the wearer as little as possible.

Conventional firefighter garments, for instance, are generally constructed having a number of discrete layers. Typically, these layers include an outer shell, a moisture barrier layer, a thermal barrier layer, and an inner lining. The layers are generally made from appropriate thermally-resistant materials to provide protection against heat and flame.

Protective garments for firefighters that are also water resistant are disclosed in U.S. Pat. No. 7,581,260, which is incorporated herein by reference. The '260 patent discloses various garments and fabrics that have made great advances in the art.

Improvements, however, are still needed in designing fabrics for protective garments that are intended to provide fire resistance. For instance, many of the outer shell fabrics used to produce fire protective garments look and appear very similar even though the fabrics are produced by different manufacturers. Consequently, different fabrics exist in the marketplace that have different properties but yet have the same appearance. Consequently, a need exists for a fabric for use in producing protective garments that not only has an excellent combination of properties but also has a distinctive look. For example, a fabric with a distinctive look would be easily recognized by those purchasing the garments and those who wear and are protected by the garments. By having a distinctive look, purchasers and wearers can instantly determine the origination of the fabric and the quality of the fabric. By recognizing the appearance of the fabric, for instance, a firefighter can know the fire resistant properties of the fabric, the water resistant properties of the fabric, and the durability of the fabric. Understanding the fabric quality provides the purchaser and the wearer with confidence that the garment will withstand the harsh environments to which it will be subjected.

SUMMARY

In general, the present disclosure is directed to a distinctly recognizable fabric and to products made from the fabric. In accordance with the present disclosure, the fabric includes at least two different types of yarns that, when woven together, form a pattern of discrete ornamental designs within the fabric. The fabric can be used in numerous applications, including use as an upholstery fabric, a weather resistant fabric to produce outdoor awnings, a fabric for producing clothing, and the like.

In one embodiment, the present disclosure is directed to flame resistant garments that are made from a flame resistant fabric. The flame resistant garment, for instance, may comprise any protective garment designed to protect a wearer from exposure to heat and/or flame. In one embodiment, for instance, the protective garment may comprise a fireman turnout coat, trousers worn by firemen, or any other garment worn by firefighters. In an alternative embodiment, the garment may comprise apparel worn by military personnel. For instance, the garment may comprise a bomb suit, tank uniform, other combat garments, a flight jacket, or the like. In still another embodiment, the garment may comprise industrial workwear or may comprise a protective chemical suit. The garment may comprise a shirt, a coat, a jacket, trousers, gloves, boots, protective headgear such as a hat, or the like.

In one embodiment, the present disclosure is directed to a flame resistant garment for turnout coats for firemen comprising a woven fabric shaped to cover at least a portion of a wearer's body. The woven fabric comprises background yarns woven with figure yarns. The background yarns and the figure yarns extend in both the warp direction and the fill direction. The background yarns and the figure yarns form a repeat within the fabric. Within the repeat, the figure yarns form a pattern of discrete ornamental designs. As used herein, a pattern of discrete ornamental designs can comprise discrete geometric designs and/or discrete fanciful designs. The discrete ornamental designs can be connected together in at least one direction, such as in the lengthwise direction, the widthwise direction, and/or the diagonal direction. A pattern of discrete ornamental designs, however, excludes a grid pattern formed by simply intersecting warp yarns and fill yarns in a fabric.

In one embodiment, the repeat formed by the background yarns and the figure yarns is formed from about 6 yarns to about 20 yarns in the warp direction that intersect with about 6 yarns to about 20 yarns in the fill direction. For instance, in one embodiment, the repeat is formed from about 7 to about 9 yarns in the warp direction that intersect with about 7 to about 9 yarns in the fill direction.

Although the present disclosure is not limited to any particular yarn configuration, in one embodiment, the background yarns and the figure yarns are positioned in the fabric in the warp direction at a ratio within the repeat of from about 3:1 to about 1:3. Similarly, the background yarns and the figure yarns can be positioned in the fabric in the fill direction also at a ratio within the repeat of from about 3:1 to about 1:3. In one particular embodiment, the background yarns and the figure yarns are present at a ratio in the warp direction and in the fill direction of 1:1.

In one particular embodiment, the pattern of discrete ornamental designs comprises a spiral pattern. The spiral pattern within the garment can include spiral figures. The spiral figures can form rows, columns and/or diagonals in the fabric. In one embodiment, the spiral figures can be interconnected along a diagonal direction while not being connected in the warp direction or the fill direction. Each spiral figure can have a width of from about 2 mm to about 6 mm and can have a length of from about 2 mm to about 6 mm.

The background yarns and the figure yarns can be made from any suitable material. In general, the background yarns are visually different from the figure yarns. In one embodiment, the woven fabric is made from at least 75% by weight flame resistant fibers. For instance, at least one of the background yarns or the figure yarns can be comprised of aramid fibers, such as para-aramid fibers, meta-aramid fibers, or mixtures thereof. In one particular embodiment, the figure yarns may contain FBI, PBO, or mixtures thereof. The FBI fibers, PBO fibers, or mixtures can be present in the fibers in an amount from about 30% to about 60% by weight.

In one embodiment, the woven fabric includes a combination of filament yarns and spun yarns. For instance, the figure yarns may comprise the spun yarns and the background yarns may comprise the filament yarns or vice versa. In one embodiment, the woven fabric contains FR cellulose fibers.

The woven fabric, when used for fire resistant applications especially, can have a basis weight of from about 3 osy to about 9 osy. The woven fabric can have any suitable weave, such as a twill-like weave.

In addition to being directed to a flame resistant garment, the present disclosure is also directed to a fabric as described above. The fabric can be used in almost a limitless variety of applications.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
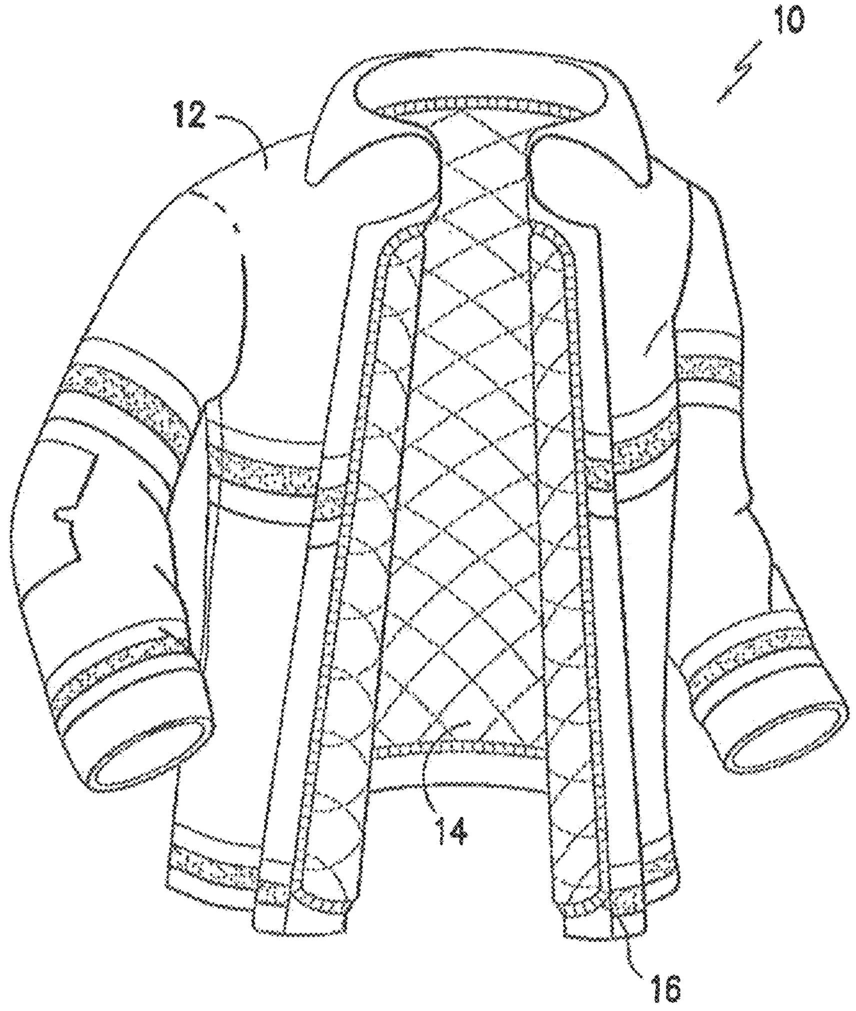
FIG. 1 is a perspective view of one embodiment of a protective garment made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a fabric that can have a distinctive look. In addition to being capable of having a distinct look, the fabric also has excellent overall properties, especially stretch properties in multiple directions. Fabrics made according to the present disclosure can be used in numerous and diverse applications. For instance, the fabrics can be used to produce articles of clothing, can be used as upholstery fabrics, and/or can be used in any functional or non-functional applications.

In one embodiment, the fabric can be used to produce protective garments, especially garments that provide heat and flame resistance to a wearer. For example, the fabric can contain flame resistant fibers, such as inherently flame resistant fibers or fibers that have been treated with a flame retardant.

As will be explained in greater detail below, fabrics of the present disclosure are formed from background yarns and figure yarns. The background yarns and figure yarns form a repeat within the fabric. Within the repeat, the figure yarns form a pattern of discrete ornamental designs. As used herein, a pattern of discrete ornamental designs is to be distinguished from a simple grid pattern in which the grids are not discrete in that they are not separated from one another. The fabric of the present disclosure may not only possess a unique appearance, but also possesses an excellent combination of properties. For instance, the fabric can be made with excellent strength properties in combination with excellent tactile characteristics. The fabric can be very strong while also having a soft hand and being very flexible. Of particular advantage, the fabric can be woven with a unique weave design, such as a diamond twill weave, that produces excellent stretch properties in multiple directions, especially in directions diagonal to the warp direction and the fill direction.

As described above, various protective garments may be made in accordance with the present disclosure. The protective garments include, for instance, footwear, trousers, jackets, coats, shirts, headwear, gloves, and the like. The fabric can also be used to construct one-piece jumpsuits, which may be well suited for use in industrial settings.

The garments can be constructed so as to be worn in all types of environments and can be worn by people with different occupations. In one embodiment, the garment may comprise a military garment, such as a battledress uniform. The garment may also comprise various other military apparel, such as flight suits, military jackets, military parkas, and the like.

In one embodiment, the fabric may be used to construct a garment worn by firefighters. For instance, referring to FIG. 1, one embodiment of a fireman turnout coat 10 constructed in accordance with the present disclosure is illustrated. Garment 10 includes a relatively tough outer shell 12 having a liner assembly 14 located therein. Outer shell 12 and liner assembly 14 together function to protect a wearer from heat and flame such as may be encountered during firefighting activities.

In the illustrated embodiment, liner assembly 14 is constructed as a separate unit that may be removed from outer shell 12. A zipper 16 is provided for removably securing liner assembly 14 to outer shell 12. It should be appreciated, however, that other suitable means of attachment, including a more permanent type of attachment such as stitches, may also be used between liner assembly 14 and outer shell 12.

Figure 2:
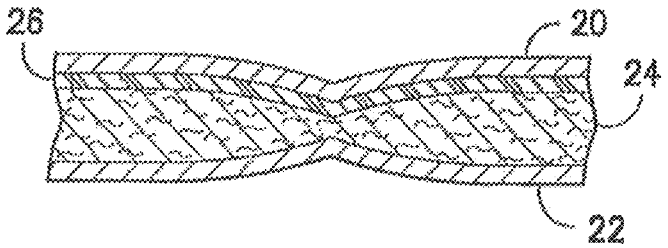
FIG. 2 is a cross-sectional view of the garment illustrated in FIG. 1.

The construction of protective garment 10 is more particularly illustrated in FIG. 2. As shown, liner assembly 14 includes a plurality of material layers quilted together. The outermost layers, i.e. lining layers 20 and 22, are connected together about their respective peripheries to form an inner cavity. A thermal barrier layer 24 and a moisture barrier layer 26 are located within the inner cavity, as shown. Typically, lining layer 20 will be adjacent the wearers body during use, whereas lining layer 22 will be adjacent outer shell 12.

Thermal barrier layer 24 can be made from various materials. For instance, an aramid felt, such as a felt produced from NOMEX fibers obtained from DuPont can be used. The felt functions as an insulator to inhibit transfer of heat from the ambient-environment to the wearer.

Moisture barrier 26 is preferably a suitable polymeric membrane that is impermeable to liquid water but is permeable to water vapor. Moisture barrier layer 26 is designed to prevent water contacting the exterior surface of garment 10 from reaching the wearer while at the same time permitting the escape of perspiration from the wearer.

In the embodiment described above, the fireman turnout coat 10 includes multiple layers. In other embodiments, however, it should be understood that a coat or jacket made in accordance with the present disclosure may include a single layer or may include an outer shell attached to a liner. For example, wildland firefighter garments are typically one or two layers.

Figure 3:
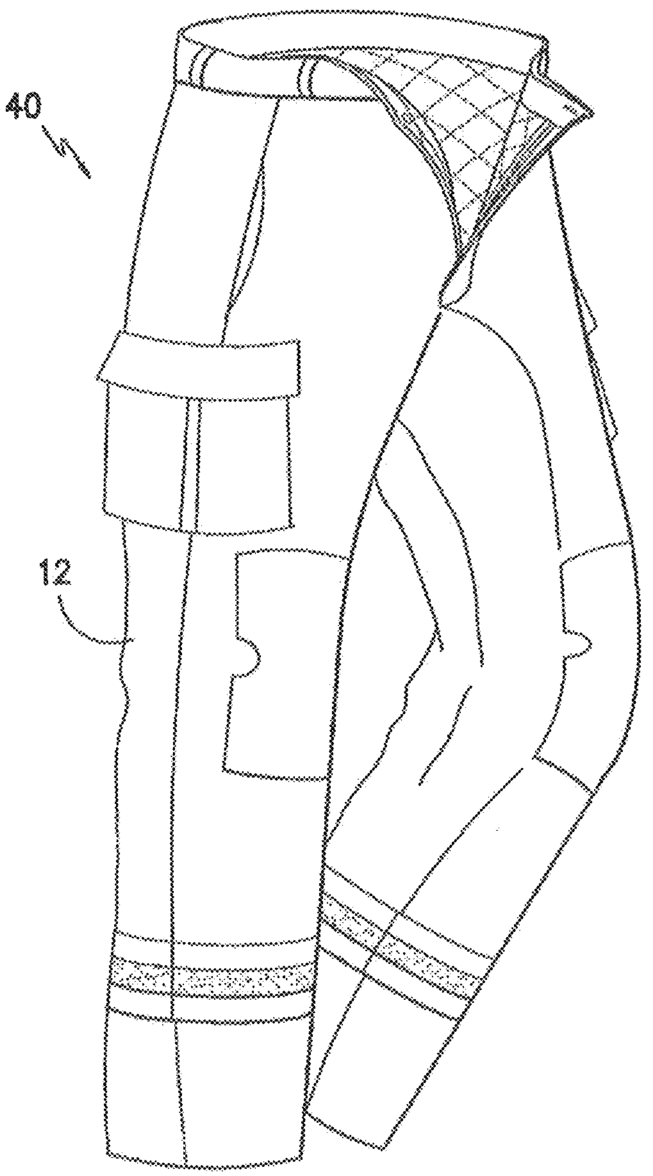
FIG. 3 is a perspective view of one embodiment of trousers made in accordance with the present disclosure.
Figure 4:
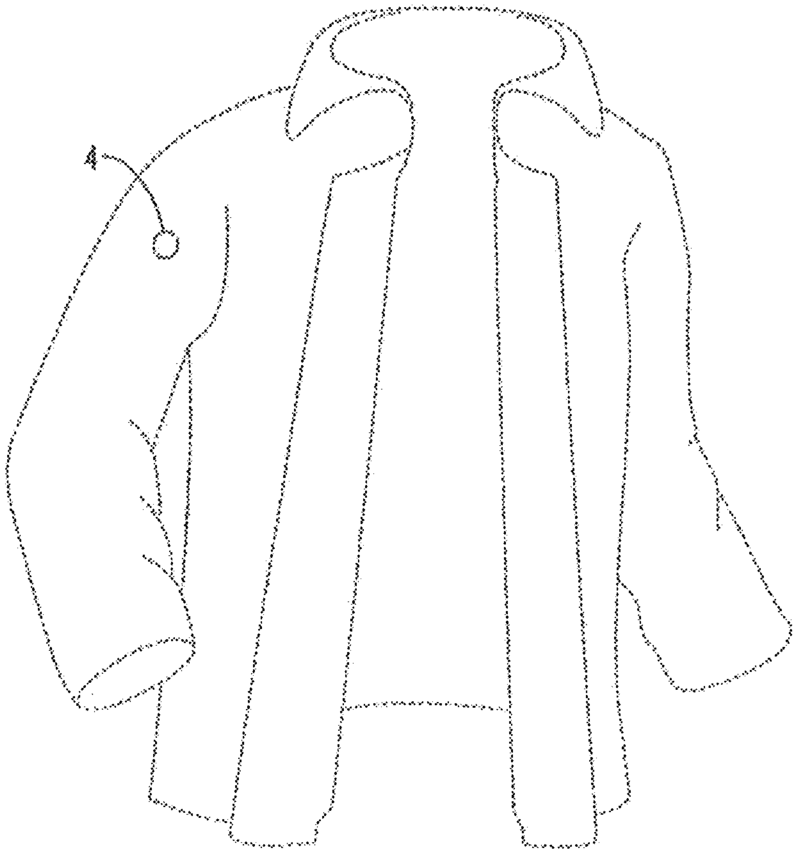
FIG. 4 is a front perspective view of a first embodiment of a coat showing a design as embodied by a fabric used to construct the coat.
Figure 5:
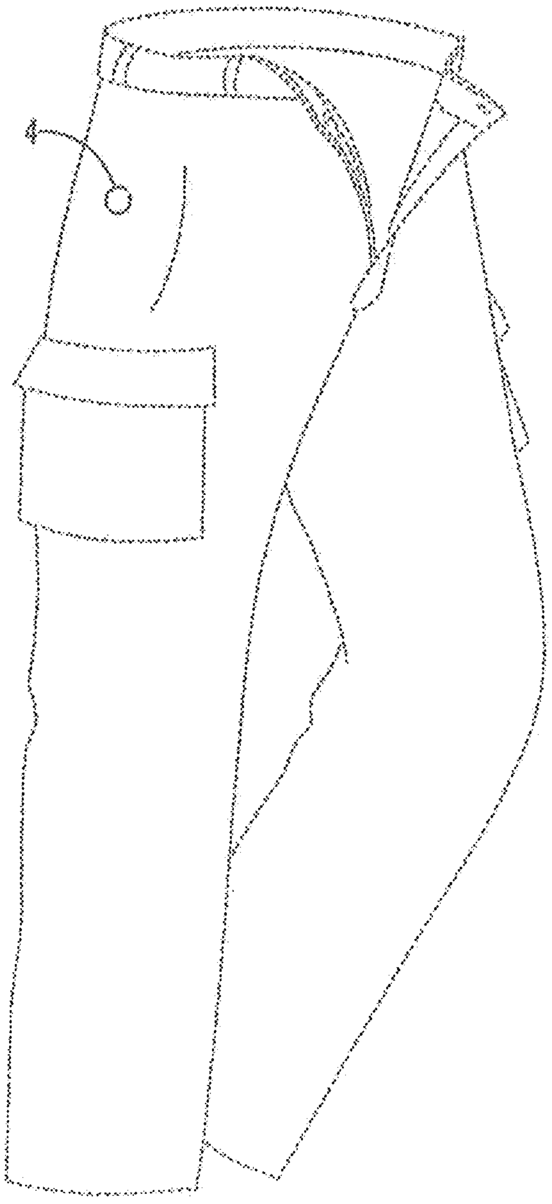
FIG. 5 is a front perspective view of a first embodiment of trousers showing the design illustrated in FIG. 4.

Referring to FIG. 3, a pair of trousers made in accordance with the present disclosure is shown. The trousers 40 as shown in FIG. 3 can be used in conjunction with the turnout coat 10 illustrated in FIG. 1. The trousers 40 also include an outer shell 12 made from the fabric of the present disclosure.

The outer shell 12 and/or the lining fabric 20 can be made from the fabric of the present disclosure. In the embodiments illustrated in the figures, the outer shell 12 is made from a fabric in accordance with the present disclosure.

Figure 6:
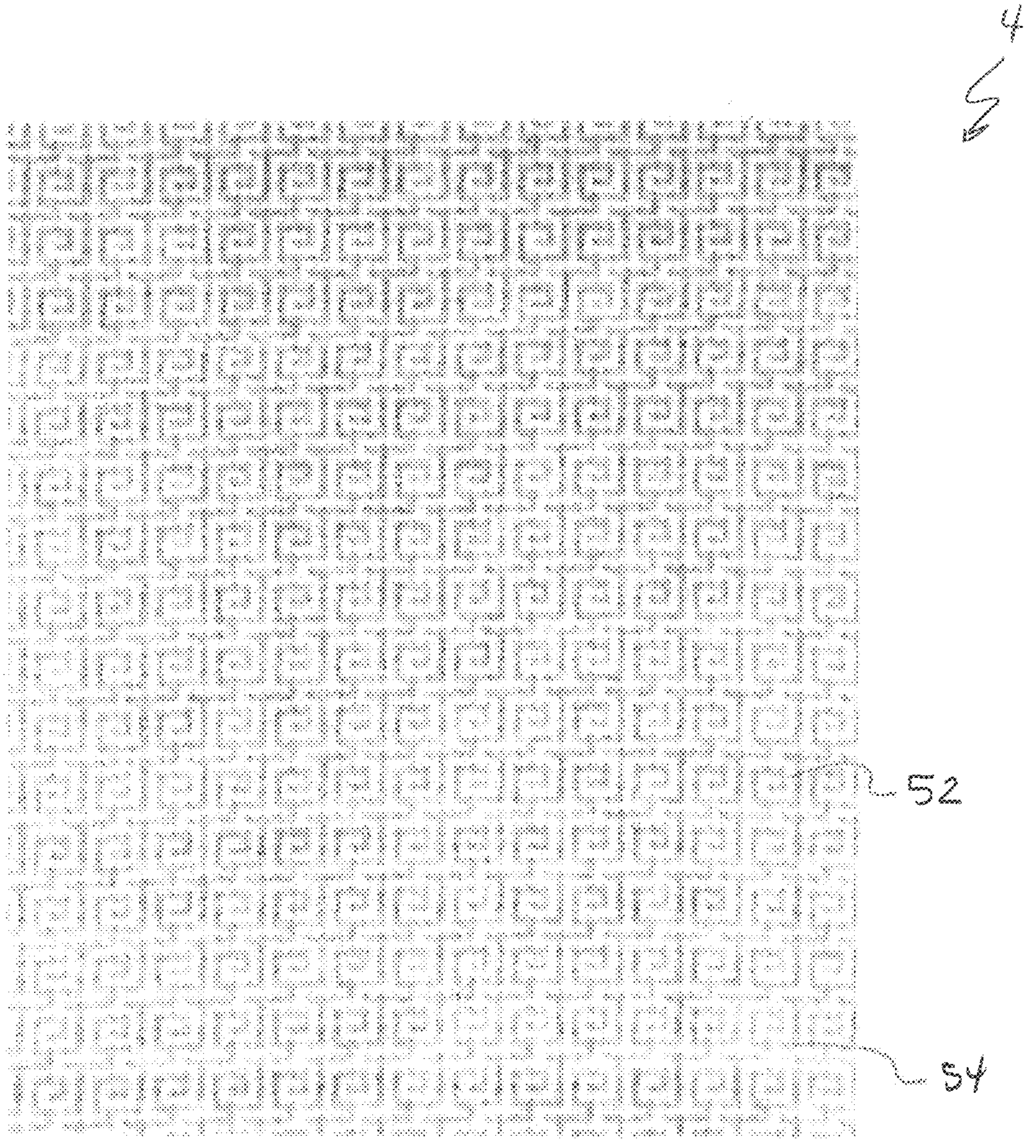
FIG. 6 is an enlarged plan view of one side of a fabric that embodies the design as illustrated in FIGS. 4 and 5.
Figure 7:
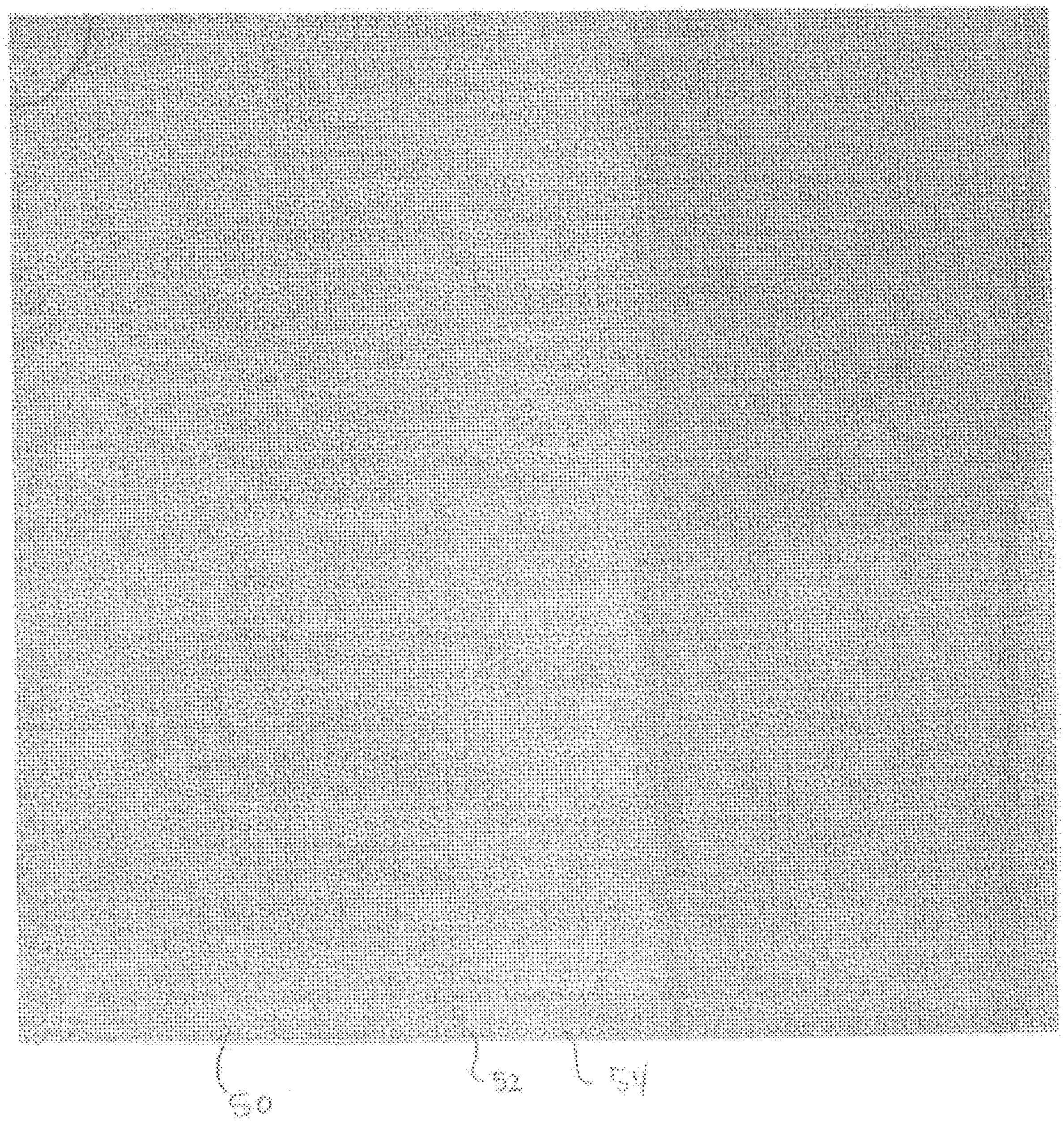
FIG. 7 is a plan view of one side of a fabric that embodies the design illustrated in FIGS. 4 and 5.
Figure 8:
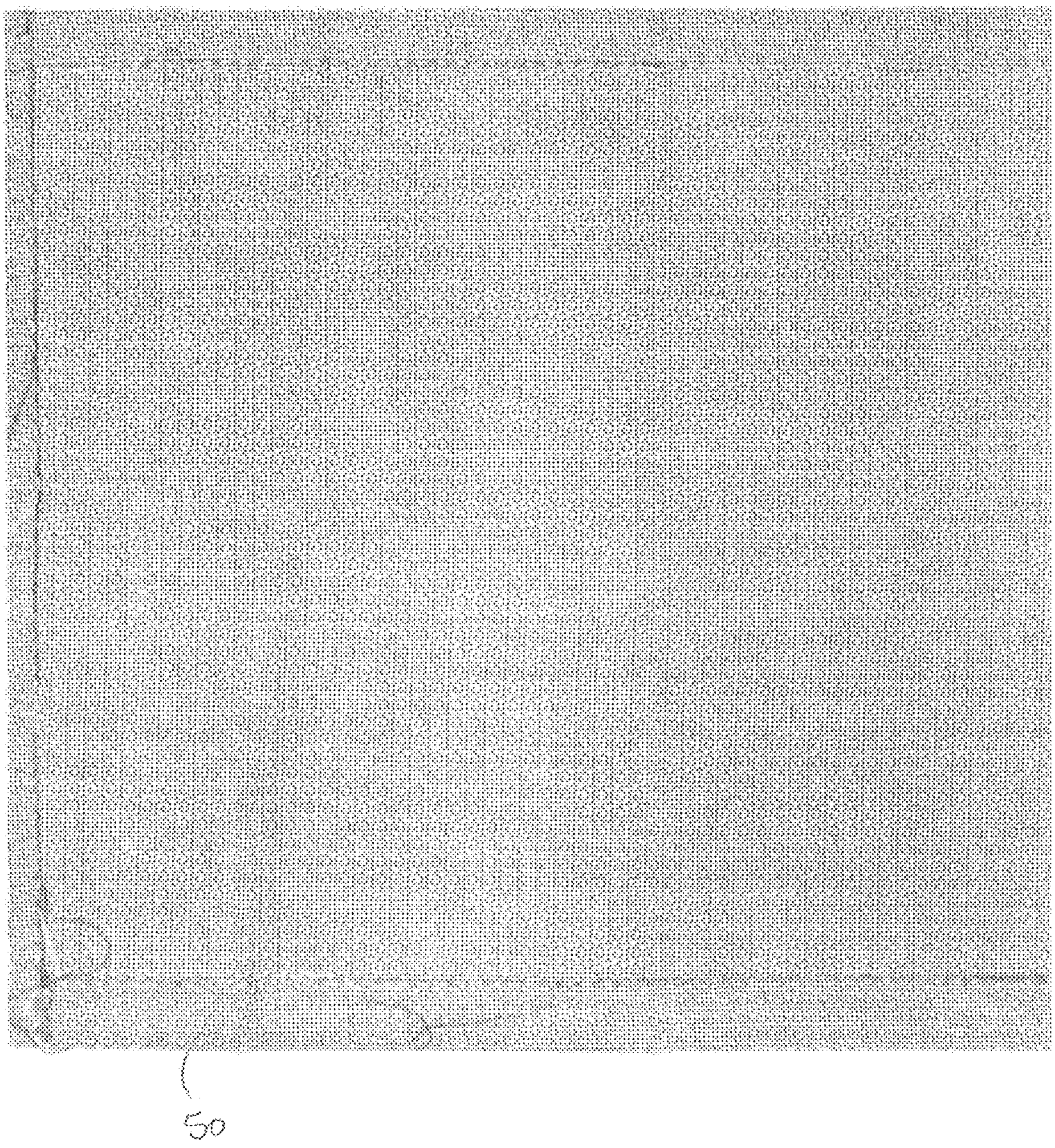
FIG. 8 is a plan view of an opposite side of the fabric that embodies the design illustrated in FIGS. 4 and 5.

Referring to FIGS. 6-10, one embodiment of a fabric 50 made in accordance with the present disclosure is shown in greater detail. FIGS. 6 and 7 illustrate one side of the fabric, while FIG. 8 illustrates an opposite side of the fabric. FIG. 10 is an enlarged view of the fabric 50 in order to better illustrate the appearance of the fabric.

As shown in FIGS. 6-8 and 10, the fabric 50 includes a pattern of discrete ornamental designs 52 that are imposed on a background 54. In the embodiment illustrated in the figures, the discrete ornamental designs 52 comprise spiral figures. It should be understood, however, that in other embodiments the discrete ornamental designs may have other shapes. For instance, the ornamental design may comprise squares, arrowheads, triangles, other polygons, circles, ovals, and the like. In other embodiments, the ornamental designs may comprise a linear design, such as a linear figure that has angular portions such that the overall design appears to zigzag or have a labyrinth-type configuration. In an alternative embodiment, the discrete ornamental design may have the appearance of a key, such as a Greek key.

In order to form the pattern of ornamental designs as shown in FIGS. 6-10, the fabric contains figure yarns and background yarns that have been woven together. In order for the ornamental designs to be visible, the figure yarns have at least one property that is in contrast to the background yarns. For instance, in one embodiment, the figure yarns can have a different color than the background yarns. Alternatively, the figure yarns may have a different texture than the background yarns. In still another embodiment, the figure yarns and background yarns can have a different shade or other different color characteristic.

The fabric can contain a single figure yarn and a single background yarn. Alternatively, the fabric may contain different types of figure yarns and different types of background yarns. For instance, the fabric may include a single figure yarn and a plurality of different types of background yarns. Alternatively, the fabric may contain a plurality of figure yarns and only a single type of background yarn. The type of figure yarn and background yarn can be varied by varying one characteristic of the yarn, such as the fibers used to produce the yarn and/or the color of the yarn.

In constructing the fabric 50, the figure yarns and the background yarns are woven together to form a repeat within the fabric. The repeat may be consistent over the entire surface of the fabric or may only occur at certain locations within the fabric. Within the repeat, the figure yarns and the background yarns form the pattern of the ornamental designs.

In general, within the repeat, the figure yarns extend in both the warp direction and the fill direction and the background yarns also extend in both the warp direction and the fill direction. The repeat can be formed from as little as 6 yarns in both the warp direction and the fill direction and as many as 100 yarns in both the warp direction and the fill direction. In one embodiment, for instance, the repeat is formed using at least 6 yarns, such as at least 7 yarns, such as at least 8 yarns, such as at least 9 yarns, such as at least 10 yarns, in the warp direction and is formed from at least about 6 yarns, such as at least about 7 yarns, such as at least about 8 yarns, such as at least about 9 yarns, such as at least about 10 yarns in the fill direction. The repeat can be formed from less than about 80 yarns, such as less than about 60 yarns, such as less than about 40 yarns, such as less than about 20 yarns, such as less than about 15 yarns, such as less than about 14 yarns, such as less than about 13 yarns, such as less than about 12 yarns, such as less than about 11 yarns in the warp direction and in the fill direction.

In one particular embodiment, the repeat is formed from about 7 to about 9 yarns in the warp direction that intersect with about 7 to about 9 yarns in the fill direction. The warp yarns and the fill yarns within the repeat comprise the figure yarns and the background yarns.

The ratio between the figure yarns and the background yarns within the repeat of the fabric can vary depending upon many factors, including the type of yarns being used and the type of ornamental design being incorporated into the fabric. In one embodiment, for instance, the background yarns and the figure yarns are positioned in the fabric in the warp direction at a ratio within the repeat of from about 3:1 to about 1:3. Similarly, the background yarns and the figure yarns can be positioned in the fabric in the fill direction at a ratio within the repeat of from about 3:1 to about 1:3. The above ratio can refer to one type of figure yarn in relation to all of the background yarn, can refer to one figure yarn in relation to one background yarn, or can refer to all of the figure yarns in relation to all of the background yarns. In one particular embodiment, within the repeat, the background yarns and the figure yarns are present in a ratio in the warp direction of 1:1 and are present at a ratio in the fill direction of 1:1.

The ornamental discrete designs formed in the pattern contained within the fabric repeat can be completely separated from each other or can be interconnected. If interconnected, the ornamental designs, in one embodiment, are only connected along three sides, such as only along two sides, such as only along one side.

Referring to the embodiments illustrated in FIGS. 6-10, as described above, the ornamental design comprises a pattern of spiral figures. In the embodiment illustrated, the ornamental designs form columns and form rows within the fabric. In other embodiments, however, the ornamental designs may be offset such that the designs only appear in rows or only appear in columns. In still another embodiment, the pattern of ornamental designs may look random such that the ornamental designs do not line up in columns or in rows.

The pattern of ornamental designs shown in FIGS. 6-10 also form diagonals within the fabric. In fact, the spiral figures are interconnected along a diagonal direction while not being connected in the warp direction or the fill direction. In other embodiments, however, the ornamental designs may be connected only along the warp direction, only along the fill direction, or may be interconnected along at least two directions comprising the warp direction, the fill direction, and the diagonal direction.

Each individual ornamental design may vary in dimension depending upon the particular application and the desired result. In one embodiment, however, each ornamental design may have a width of from about 2 mm to about 6 mm and may have a length of from about 2 mm to about 6 mm. For instance, each spiral figure may have a width of from about 3 mm to about 5 mm and may have a length of from about 3 mm to about 5 mm.

Figure 9:
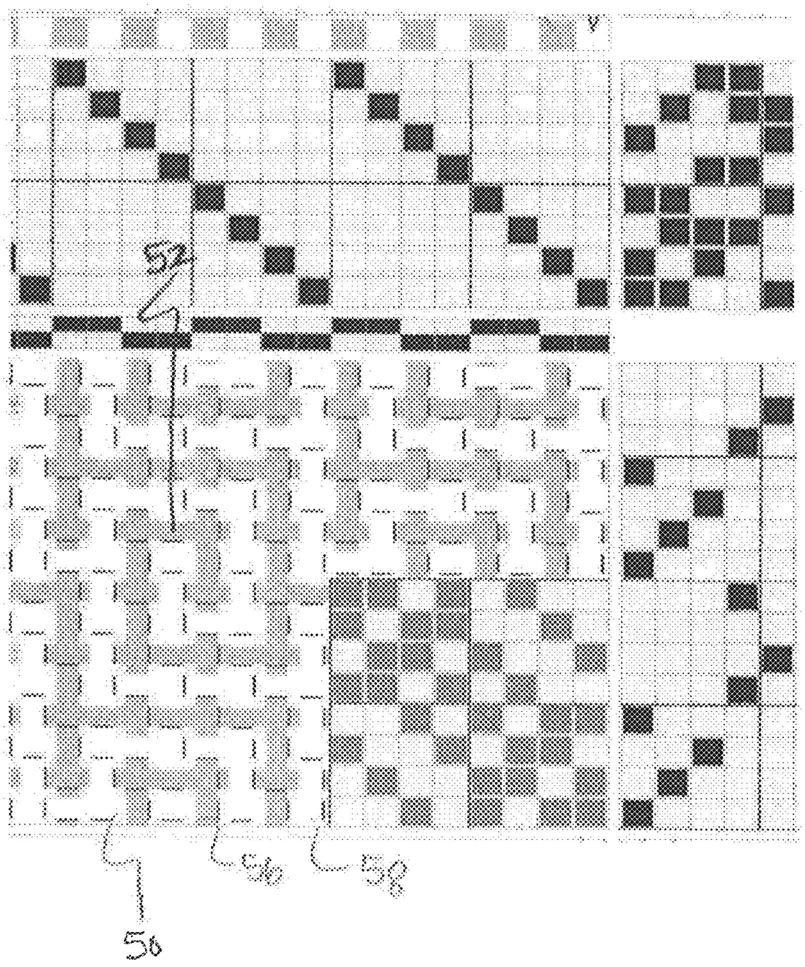
FIG. 9 is a diagram representing one embodiment of a fabric made in accordance with the present disclosure.

Referring to FIG. 9, one embodiment of a weave that may be used in order to form the fabric 50 as shown in FIGS. 6-10 is illustrated in greater detail. As shown, the fabric 50 is formed from figure yarns 56 and background yarns 58. In the embodiment illustrated, the figure yarns and the background yarns are in a 1:1 ratio in the warp direction and are in a 1:1 ratio in the fill direction. In the embodiment illustrated in FIG. 9, the weave repeat is 8 warp yarns×8 fill yarns. The yarns are woven in a twill-like weave, such as a diamond twill weave, that forms the discrete ornamental designs 52 which comprise, in this embodiment, spiral figures.

The figure yarns 56 and the background yarns 58 can be made from various different materials depending upon the particular application. For instance, when producing garments, such as shirts, jackets, and the like, the yarns can contain natural fibers, synthetic fibers, or mixtures thereof. For instance, the yarns can contain cotton fibers, rayon fibers, nylon fibers, nylon filaments, polyester fibers, polyester filaments, acrylic fibers, acrylic filaments, modacrylic fibers, modacrylic filaments, and mixtures thereof.

When the fabric is used to form protective garments, the yarns can contain flame resistant materials. For instance, the background yarns and the figure yarns can contain FR cellulose fibers, FR cellulose filaments, para-aramid fibers, para-aramid filaments, meta-aramid fibers, meta-aramid filaments, polybenzimidazole (FBI) fibers, FBI filaments, poly-p-phenylenebenzobisoxazole (PBO) fibers, PBO filaments, and the like. FR cellulose fibers include FR viscose fibers including FR viscose filaments.

The background yarns and the figure yarns can contain the same materials or can contain different materials. In addition, the background yarns and the figure yarns can both be spun yarns, can both be multifilament yarns, can both be monofilament yarns, or can be mixtures thereof. For instance, the background yarns can be spun yarns while the figure yarns can be filament yarns and vice versus. In yet another embodiment, the figure yarns may comprise a combination of multifilament yarns and stretch broken yarns, while the background yarns may comprise spun yarns and vice versus.

In one embodiment, especially when producing flame resistant fabrics for use in firefighter garments, the fabric contains spun yarns in combination with filament yarns. As described above, the figure yarns may comprise filament yarns while the background yarns may comprise spun yarns or alternatively the background yarns may comprise filament yarns and the figure yarns may comprise spun yarns.

The filament yarns may be made from an inherently flame resistant material. For example, the filament yarns may be made from an aramid filament, such as a para-aramid filament or a meta-aramid filament. The use of a para-aramid filament yarn increases the strength of the fabric while also providing excellent flame resistant properties. In one embodiment, the filament yarns may comprise a combination of para-aramid filaments and meta-aramid filaments. In still another embodiment, the fabric may contain filament yarns comprising para-aramid filaments and other filament yarns comprising meta-aramid filaments.

In other embodiments, the filament yarns may be made from other flame resistant materials. For instance, the filament yarns may be made from poly-p-phenylenebenzobisoxazole fibers (PBO fibers), and/or FR cellulose fibers, such as FR viscose filament fibers. In one embodiment, the filament yarns can comprise a blend of two or more of the above materials including aramid filaments. In addition, the filament yarns may contain other filaments, such as nylon filaments, polyester filaments, or the like. For example, nylon filaments, polyester filaments, or other non-inherently flame resistant synthetic filaments may be present in an amount up to about 20% by weight, such as up to an amount of 15% by weight, such as up to an amount of 10% by weight.

When the filament yarns contain aramid filaments, such as para-aramid filaments, meta-aramid filaments, or mixtures thereof, the filaments can contain the aramid filaments in an amount of greater than 50% by weight, such as greater than 60% by weight, such as greater than 70% by weight, such as greater than 80% by weight, such as greater than 90% by weight. In one embodiment, the filament yarns are made entirely from aramid filaments. In an alternative embodiment, the filament yarns may contain relatively minor amounts of aramid filaments, such as in amounts less than 10% by weight, such as in amounts less than 8% by weight, such as in amounts less than about 6% by weight.

When containing FR cellulose and aramid filaments, the yarns may contain FR cellulose in an amount up to about 10% by weight, such as up to about 20% by weight, such as up to about 30% by weight, such as up to about 40% by weight, such as up to about 50% by weight, such as up to about 60% by weight, such as up to about 70% by weight. In one embodiment, the filament yarns may be made exclusively from FR cellulose filaments or may contain FR cellulose filaments in an amount greater than 95% by weight.

The filament yarns may be combined with spun yarns or the fabric can be made exclusively of spun yarns. The spun yarns, in one embodiment, may contain polybenzimidazole fibers alone or in combination with other fibers. For example, in one embodiment, the spun yarns may contain polybenzimidazole fibers in combination with aramid fibers, such as para-aramid fibers, meta-aramid fibers, or mixtures thereof.

Instead of or in addition to containing polybenzimidazole fibers, the spun yarns may contain aramid fibers as described above, modacrylic fibers, preoxidized carbon fibers, melamine fibers, polyimide imide fibers, polyimide fibers, and mixtures thereof.

In one particular embodiment, the spun yarns contain polybenzimidazole fibers in an amount greater than about 30% by weight, such as in an amount greater than about 40% by weight. The polybenzimidazole fibers may be present in the spun yarns in an amount less than about 60% by weight, such as in an amount less than about 55% by weight. The remainder of the fibers, on the other hand, may comprise para-aramid fibers and/or meta-aramid fibers.

In one embodiment, various other fibers may be present in the spun yarns. For instance, the spun yarns may contain fibers treated with a fire retardant, such as FR cellulose fibers. Such fibers can include FR cotton, FR rayon, FR acetate, FR triacetate, and FR lyocell, and the like. The spun yarns may also contain nylon fibers if desired, such as antistatic fibers.

In one embodiment, the spun yarns contain aramid fibers, such as para-aramid fibers, meta-aramid fibers, or mixtures thereof. In one embodiment, the spun yarns contain aramid fibers in an amount greater than 50% by weight, such as in an amount greater than 60% by weight, such as in an amount greater than 70% by weight, such as in an amount greater than 80% by weight, such as in an amount greater than 90% by weight, such as in an amount of 100% by weight. The spun yarns may also contain the aramid fibers in an amount less than 70% by weight, such as less than 60% by weight, such as less than 50% by weight, such as less than 40% by weight, such as less than 30% by weight, such as less than 20% by weight, such as less than 10% by weight.

In one embodiment, the spun yarns can contain PBO fibers. PBO fibers can be present in the spun yarns in an amount from about 10% to 100% by weight. In one embodiment, the spun yarns contain PBO fibers in an amount greater than about 30% by weight, such as in an amount greater than about 40% by weight. The PBO fibers may be present in the spun yarns in an amount less than about 60% by weight, such as in an amount less than about 55% by weight. The PBO fibers can be combined with other fibers, such as para-aramid fibers, FBI fibers, FR cellulose fibers, nylon fibers, polyester fibers, and/or any blend thereof.

In other embodiments, the figure yarns and the background yarns can all be made from filament yarns. In this embodiment, the filament yarns may be the same or different. Any of the filament yarns described above can be used to construct the figure yarns and the background yarns.

Similarly, the figure yarns and the background yarns may comprise only spun yarns. The spun yarns used for the figure yarns and the spun yarns used for the background yarns can be made from the same fiber furnish or from a different fiber furnish. Any of the spun yarns described above may be used to produce the figure yarns and/or the background yarns.

In one embodiment, the spun yarns and filament yarns are present in the fabric such that the fabric contains polybenzimidazole fibers in an amount of at least about 20% by weight, such as in an amount of at least about 25% by weight, such as in an amount of at least about 30% by weight, such as in an amount of at least about 35% by weight, such as in an amount of at least about 40% by weight. In general, the polybenzimidazole fibers may be present in the fabric in an overall amount of less than about 70% by weight, such as less than about 60% by weight, such as less than about 50% by weight.

When producing fabrics for use as everyday clothing wear, for upholstery applications, for outdoor fabric applications, and the like, the figure yarns and the background yarns may not contain fire resistant materials. The yarns, for instance, can be made from nylon fibers, nylon filaments, polyester fibers, polyester filaments, polyolefin fibers, polyolefin filaments, acrylic fibers, acrylic filaments, modacrylic fibers, modacrylic filaments, cotton fibers, cotton filaments, rayon fibers, rayon filaments, and blends thereof. In one embodiment, for instance, the fabric can contain nylon or polyester filament yarns combined with spun yarns containing cotton fibers, polyester fibers, nylon fibers, or blends thereof. In one embodiment, the background yarns may comprise spun yarns, while the figure yarns may comprise filament yarns. Alternatively, the background yarns may comprise filament yarns and the figure yarns may comprise spun yarns.

In general, various different weave patterns may be used to produce the fabric. For instance, a twill weave, a plain weave, a rip stop weave, or a herringbone weave may be used. In one particular embodiment, the fabric may have a twill weave or a twill-like weave. In a twill weave, crossings of adjacent warps occur along diagonal twill lines. In a 2×1 twill weave, the warp yarns pass over two fill yarns before interlacing with a third yarn. The interfacings are offset along a diagonal to produce characteristic twill lines. In one embodiment, a diamond twill weave is used to produce the fabric as shown in FIG. 9.

The sizes of the yarns and the basis weight of the fabric can vary depending upon the particular application and the desired results. As used herein, the size of a yarn refers to its weight per unit length. For filament yarns, size is measured in denier, while for spun yarns size is measured as yarn count. As used herein, a larger sized yarn is generally coarser while a smaller sized yarn is finer. In general, the filament yarns can have a denier of greater than about 50, such as greater than about 100. The denier is generally less than about 1000, such as less than about 900. The spun yarn, on the other hand, can have a count or size of generally greater (more coarse) than about 108/2, such as greater than 70/2 and can have a count of less than (finer) about 14/2, such as less than about 18/2.

In one embodiment, the size of the filament yarns may be greater than the size of the spun yarns. In fact, various advantages and benefits may be obtained by having the size of the filament yarn larger than the size of the spun yarn. Increasing the size of the filament yarn, for instance, may dramatically increase the strength of the fabric.

For example, when the filament yarns have a denier of 800, the spun yarns can have a size or count of 14/2 or finer. When the filament yarns have a denier of 600, the spun yarns can have a count of 18/2 or finer, such as 20/2 or finer. When the filament yarns have a denier of 400, the spun yarns can have a count of about 27/2 or finer, such as about 32/2 or finer. When the filament yarns have a denier of 200, on the other hand, the spun yarns can have a count of about 54/2 or finer. When the filament yarns have a denier of about 100, the spun yarns can have a count of about 108/2 or finer.

In one embodiment, the filament yarns can have a denier of from about 200 to 600, while the spun yarns can have a count of from about 54/2 to about 14/2.

Although various benefits may be obtained by having the size of the filament yarn be larger than the size of the spun yarn, in other embodiments, there may be advantages to having the spun yarn be larger in size than the filament yarn.

In other embodiments, the fabric may only contain spun yarns or may only contain filament yarns. When only containing spun yarns, the background yarns can have a larger size or a smaller size than the figure yarns. Similarly, if the fabric only contains filament yarns, the background yarns can have a larger size or a smaller size than the figure yarns. When producing fabrics only containing spun yarns or only containing filament yarns, any of the yarn sizes described above may be used.

The basis weight of fabrics made according to the present disclosure can vary depending upon various factors and the end use application. Of particular advantage, fabrics made according to the present disclosure can have excellent properties at relatively lighter basis weights. In general, the fabric can have a basis weight of from about 0.5 osy to about 9 osy, such as from about 3 osy to about 8 osy. In one embodiment, the basis weight can be less than about 7 osy, such as less than about 7.5 osy.

Once the fabric is constructed, the fabric may be treated with various coatings and finishes as may be desired. In one embodiment, for instance, the fabric may be treated with a durable water resistant treatment. The durable water resistant treatment may comprise, for instance, a fluoropolymer. Other treatments that may be applied to the fabric include insect repellents and/or a moisture management finish.

Many different types of durable water resistant treatments may be applied to the fabric. In one embodiment, the durable water resistant treatment forms a finish (as opposed to a coating) on the fabric. The durable water resistant treatment can be applied to the fabric by treating the fabric with a bath containing the treatment, padding the composition into the fabric, placing the fabric on a tenter frame, and heating the fabric in order to evaporate all volatiles. During the process, the durable water resistant treatment may be applied to the fabric in an amount from about 0.5% to about 10% by weight, such as from about 1% to about 5% by weight.

In many applications, the durable water resistant treatment may comprise a fluoropolymer. Particular durable water resistant treatments that may be applied to the fabric in accordance with the present disclosure are discussed in greater detail below.

In one embodiment, the DWR comprises at least one member selected from the group consisting of a perfluoroalkyl group-containing substance, a fluorine-containing surfactant, a fluorine-containing oil, a fluorosilicone oil and a silicone oil. Preferably the fluorine-containing resin derives from an aqueous dispersion or dissolving in a solvent. Preferably, the fluorine-containing resin comprises a fluororesin or a mixture of a fluororesin and some other resin. Preferably, the fluororesin is a copolymer of a fluoroolefin and a vinyl monomer. Preferably, the fluororesin is a copolymer of fluoroolefins. Preferably, the copolymer of fluoroolefins is a copolymer of vinylidene fluoride and a fluoroolefin other than vinylidene fluoride.

In another embodiment, a durable water/soil-resistant fluoropolymer is selected from those groups that will provide the necessary water/soil resistance and can be polymerized. Examples include fluorinated monomers of acrylates, methacrylates, alkenes, alkenyl ethers, styrenes, and the like. Monomers that contain carbon-fluorine bonds that are useful include, but are not limited to, Zonyl TA-N (an acrylate from DuPont), Zonyl™ (a methacrylate from DuPont), FX-13 (an acrylate from 3M), and FX-14 (a methacrylate from 3M) or UNIDYNE TG581 (a C6 fluoropolymer available from Daikin). The fluoropolymers may include —CF 3 and —CHF 2 end groups, perfluoroisopropoxy groups (—OCF (CF 3) 2), 3,3,3-trifluoropropyl groups, and the like. The polymers may include vinyl ethers having perfluorinated or partially fluorinated alkyl chains. The fluoropolymer preferably comprises one or more fluoroaliphatic radical-containing monomers. Monomers used to form the fluoropolymer may be based upon 6 carbon chain chemistry or 8 carbon chain chemistry.

In another embodiment, the DWR comprises a repellent and a fluorine-containing resin, wherein the repellent comprises an esterification reaction product (I-3) from a perfluoroalkyl group-containing compound (I-3-1) and a compound (I-3-2) containing a phosphoric acid group as a functional group, and the fluorine-containing resin derives from an aqueous dispersion. Preferably, the fluorine-containing resin comprises a fluororesin or a mixture of a fluororesin and some other resin. Preferably, the other resin is an acrylic resin. Preferably, the fluororesin is a copolymer of a fluoroolefin and a vinyl monomer. Preferably, the fluororesin is a copolymer of fluoroolefins. Preferably, the copolymer of fluoroolefins is a copolymer of vinylidene fluoride and a fluoroolefin other than vinylidene fluoride. Preferably, the fluorine-containing resin comprises a fluororesin obtained by seed polymerization of an acrylic resin.

Commercially available DWR not mentioned above that may be used in the present disclosure include fluoropolymer compositions sold under the name MILEASE® by Clariant, fluorochemicals sold under the tradename TEFLON® or Capstone® by DuPont, fluorochemicals sold under the by tradename ZEPEL® also by DuPont, or fluorocarbon polymers sold under the tradename REPEARL® by the Mitsubishi Chemical Company or fluorocarbon polymers sold under the tradename UNIDYNE® by the Daikin Company.

In one embodiment, if desired, an isocyanate may be present in conjunction with a fluorochemical, such as a fluoropolymer. The isocyanate may comprise a blocked isocyanate that is a formaldehyde-free cross-linking agent for fluorochemical finishes. The blocking agent may comprise a phenol or any other suitable constituent.

Once treated with a durable water resistant treatment, the fabric may have a spray rating of at least 70, such as at least 80, such as even greater than 90 after 5 laundry cycles, after 10 laundry cycles, after 20 laundry cycles, and even after 30 laundry cycles. The spray rating of a fabric is determined according to AATCC 22 and is described in U.S. Pat. No. 7,581,260.

Fabrics made according to the present disclosure can have excellent tensile strength properties. For instance, the fabric can have a break strength according to ASTM D5034 in the fill direction of greater than about 400 lbs., such as greater than about 450 lbs., such as greater than about 550 lbs., such as greater than about 600 lbs., such as greater than about 620 lbs. at a fabric weight of from about 5 osy to about 8 osy, and particularly from about 7 osy to about 7.5 osy. The break strength in the warp direction can generally be greater than about 400 lbs., such as greater than about 500 lbs., such as greater than about 550 lbs. The break strength is generally less than about 800 lbs.

The fabric can display a trap tear according to ASTM Test D5587 of greater than about 50 lbs., such as greater than about 100 lbs., such as greater than about 150 lbs., such as greater than about 180 lbs. in the fill direction. In the warp direction, the trap tear can be generally greater than about 50 lbs., such as greater than about 60 lbs., such as greater than about 70 lbs., such as greater than about 80 lbs., such as greater than about 90 lbs. The trap tear in the fill direction and in the warp direction is generally less than about 300 lbs. at the basis weights described above with respect to the break strength.

The fabric can have the above strength properties while being very flexible. For instance, when tested according to the circular bend test according to ASTM Test D4032, the fabric can have a circular bend in the fill direction of less than about 6 lbs., such as less than about 5.5 lbs., such as less than about 5 lbs., such as even less than about 4.5 lbs., especially for a fabric having a weight of from about 6.5 osy to about 7 osy. In the warp direction, the circular bend can generally be less than about 5 lbs., such as less than about 4.5 lbs., such as less than about 4 lbs., such as even less than about 3.5 lbs. In general, the circular bend is greater than about 1 lb. in both the fill direction and warp direction.

On a weight basis, fabrics made according to the present invention can have a break strength in the fill direction or in the warp direction of greater than about 60 lbs. per osy, such as greater than about 65 lbs. per osy, such as greater than about 70 lbs. per osy, such as greater than about 75 lbs. per osy, such as even greater than about 80 lbs. per osy. The break strength per weight is generally less than about 120 lbs. per osy.

The fabric of the present disclosure can also possess excellent thermal properties. For instance, when tested according to ASTM Test D6413, the fabric can have a char length in both the fill and warp direction of less than about 10 mm, such as less than about 9 mm, such as even less than about 8 mm. The char length is generally greater than about 1 mm.

In addition to having excellent mechanical properties and optionally fire resistant properties, fabrics made in accordance with the present disclosure may also display a new, original and ornamental design.

The present disclosure may be better understood with reference to the following examples.

Example No. 1

The following fabric was produced and tested for various properties. The following fabric included figure yarns and background yarns. The figure yarns comprised filament yarns, while the background yarns comprised spun yarns. The figure yarns and spun yarns were woven together as shown in FIG. 9 above. The fabric had a diamond twill weave.

The fabric contained the following yarns:

Warp Yarn: 28/2 spun yarn containing 45% para-aramid fibers, 30% meta-aramid and 25% PBO fibers. The filament yarn was a 400 denier filament yarn containing para-aramid fibers.

Fill Yarn: 28/2 spun yarn containing 45% para-aramid fibers, 30% meta-aramid and 25% PBO fibers. The filament yarn was a 400 denier filament yarn containing para-aramid fibers.

Ends: 60 per inch

Picks: 60 per inch

Weight: 6.00 osy

The fabric was also treated with a durable water resistant finish. The durable water resistant finish contained a polytetrafluoroethylene polymer.

The fabric was tested for various properties and the following results were obtained:

| TEST_METHOD | TEST_NAME | UNIT | Sample 1 |
|---|---|---|---|
| AATCC 135 | SHRINK FILL 5X | PERCENT | 0.0 |
| | SHRINK WARP 5X | PERCENT | 2.5 |
| AATCC 22 | SPRAY RATING | AATCC SCALE | 100 |
| AATCC 42 | WATER ABSORPTION | PERCENT | 0.1 |
| ASTM D 3776 | WEIGHT | OZ_SQ_YD | 6.00 |
| ASTM D 5034 | BREAK STRENGTH FILL | POUNDS | 650 |
| | BREAK STRENGTH WARP | POUNDS | 665 |
| ASTM D 5587 | TRAP TEAR FILL | POUNDS | 184 |
| | TRAP TEAR WARP | POUNDS | 92 |
| ASTM D 6413 | AFTER FLAME FILL | SECONDS | 0 |
| | AFTER FLAME WARP | SECONDS | 0 |
| | CHAR LENGTH FILL | INCH | 0.1 |
| | CHAR LENGTH WARP | INCH | 0.2 |
| NFPA 1971 8.6 | SHRINK FILL 5 MN 500 F. | PERCENT | 0.0 |
| | SHRINK WARP 5 MN 500 F. | PERCENT | 1.0 |
| ASTM D 737 | AIR PERMEABILITY | CFM | 15 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A flame resistant garment for turnout coats for firemen comprising:

a woven fabric shaped to cover at least a portion of a wearer's body, the woven fabric comprising background yarns woven with figure yarns, the background yarns and the figure yarns extending in both the warp direction and a fill direction, the backyard yarns and the figure yarns being woven in a diamond twill weave, the figure yarns comprising filament yarns and the background yarns comprising spun yarns, the background yarns and the figure yarns forming a repeat within the woven fabric, and wherein, within the repeat, the figure yarns forming a pattern of discrete ornamental designs;

wherein the repeat is formed from about 6 yarns to about 20 yarns in the warp direction that intersect with about 6 yarns to about 20 yarns in the fill direction; and wherein the ornamental discrete designs comprise spiral figures, the spiral figures being interconnected along a diagonal direction while not being connected in the warp direction or the fill direction, wherein the spiral figures form rows and columns in the fabric, wherein the spiral figures are not offset, wherein each spiral figure has a width of from about 2 mm to about 6 mm and has a length of from about 2 mm to about 6 mm, wherein the woven fabric has a break strength in the fill direction of greater than about 400 lbs, wherein the woven fabric has a break strength in the warp direction of greater than about 400 lbs, wherein the background yarns and the figure yarns are present at a ratio in the warp direction of from about 3:1 to about 1:1 and are present at a ratio in the fill direction of from about 3:1 to about 1:1.

2. A flame resistant garment as defined in claim 1, wherein the repeat is formed from about 7 to about 9 yarns in the warp direction that intersect with about 7 to about 9 yarns in the fill direction.

3. A flame resistant garment as defined in claim 1, wherein the background yarns are visually different from the figure yarns.

4. A flame resistant garment as defined in claim 1, wherein the woven fabric is made from at least 75% by weight flame resistant fibers.

5. A flame resistant garment as defined in claim 1, wherein at least one of the background yarns or the figure yarns are comprised of aramid fibers.

6. A flame resistant garment as defined in claim 1, wherein the figure yarns contain PBI, PBO, or mixtures thereof.

7. A flame resistant garment as defined in claim 1, wherein the woven fabric contains FR cellulose fibers.

8. A flame resistant garment as defined in claim 1, wherein the woven fabric contains PBI fibers, PBO fibers, or a mixture of both PBI and PBO fibers in an amount from about 30% to about 60% by weight.

9. A flame resistant garment as defined in claim 1, wherein the woven fabric has a basis weight of from about 3 osy to about 9 osy.

10. A flame resistant garment as defined in claim 1, wherein the woven fabric has a twill-like weave.

11. A woven fabric having a warp direction and a fill direction, the woven fabric comprising background yarns woven with figure yarns, the background yarns and the figure yarns extending in both the warp direction and the fill direction, the backyard yarns and the figure yarns being woven in a diamond twill weave, the figure yarns comprising filament yarns and the background yarns comprising spun yarns, the background yarns and the figure yarns forming a repeat within the woven fabric, within the repeat, the figure yarns forming a spiral pattern, the spiral pattern including spiral figures, at least certain of the spiral figures being interconnected along a diagonal direction, the spiral figures having a width of from about 1 mm to about 30 mm and having a length of from about 1 mm to about 30 mm;

wherein the repeat is formed from about 6 yarns to about 20 yarns in the warp direction that intersect with about 6 yarns to about 20 yarns in the fill direction; and wherein, within the repeat, the background yarns and the figure yarns are present at a ratio in the warp direction of 1:1 and are present at a ratio in the fill direction of 1:1, the spiral figures being interconnected along the diagonal direction while not being connected in the warp or fill direction, wherein the spiral figures form rows and columns in the fabric, wherein the spiral figures are not offset, wherein each spiral figure has a width of from about 2 mm to about 6 mm and has a length of from about 2 mm to about 6 mm, wherein the woven fabric has a break strength in the fill direction of greater than about 400 lbs, wherein the woven fabric has a break strength in the warp direction of greater than about 400 lbs.

12. A flame resistant garment as defined in claim 1, wherein the woven fabric has a break strength in the fill direction of greater than about 550 lbs, wherein the woven fabric has a break strength in the warp direction of greater than about 550 lbs.

13. A flame resistant garment as defined in claim 1, wherein the woven fabric has a trap tear of greater than about 100 lbs in the fill direction, wherein the woven fabric has a trap tear of greater than about 60 lbs in the warp direction.

14. A flame resistant garment as defined in claim 1, wherein the spun yarns have a count from about 14/2 to about 70/2.

15. A flame resistant garment as defined in claim 1, wherein the filament yarns have a denier from about 200 to about 600.

16. A flame resistant garment as defined in claim 1, wherein the woven fabric has a break strength in the fill direction or in the warp direction of greater than about 60 lbs. per osy.

17. A flame resistant garment for turnout coats for firemen comprising:

a woven fabric shaped to cover at least a portion of a wearer's body, the woven fabric comprising background yarns woven with figure yarns, the background yarns and the figure yarns extending in both the warp direction and a fill direction, the background yarns and the figure yarns forming a repeat within the woven fabric, and wherein, within the repeat, the figure yarns forming a pattern of discrete ornamental designs, wherein the figure yarns have a different color, texture, or shade than the background yarns;

wherein the repeat is formed from about 6 yarns to about 20 yarns in the warp direction that intersect with about 6 yarns to about 20 yarns in the fill direction; and wherein the ornamental discrete designs comprise spiral figures, the spiral figures being interconnected along a diagonal direction while not being connected in the warp direction or the fill direction, wherein the spiral figures form rows and columns in the fabric, wherein the spiral figures are not offset, wherein the rows and columns extend the length of the fabric, wherein each spiral figure has a width of from about 2 mm to about 6 mm and has a length of from about 2 mm to about 6 mm, wherein the woven fabric has a break strength in the fill direction of greater than about 400 lbs, wherein the woven fabric has a break strength in the warp direction of greater than about 400 lbs.

18. A flame resistant garment as defined in claim 17, wherein the repeat is over the entire surface of the fabric.

19. A flame resistant garment as defined in claim 1, wherein the rows and columns extend the length of the fabric.

20. A woven fabric as defined in claim 11, wherein the rows and columns extend the length of the fabric.

21. A flame resistant garment for turnout coats for firemen comprising:

a woven fabric shaped to cover at least a portion of a wearer's body, the woven fabric comprising background yarns woven with figure yarns, the background yarns and the figure yarns extending in both the warp direction and a fill direction, the background yarns and the figure yarns forming a repeat within the fabric, and wherein, within the repeat, the figure yarns forming a pattern of discrete ornamental designs;

wherein the repeat is formed from about 6 yarns to about 20 yarns in the warp direction that intersect with about 6 yarns to about 20 yarns in the fill direction; and wherein the ornamental discrete designs comprise spiral figures, the spiral figures being interconnected along a diagonal direction, wherein each spiral figure has a width of from about 2 mm to about 6 mm and has a length of from about 2 mm to about 6 mm.

22. A woven fabric as defined in claim 21, wherein the spiral figures form rows and columns in the fabric, wherein the spiral figures are not offset.

23. A woven fabric as defined in claim 22, wherein the repeat is over the entire surface of the fabric.

* * * * *